(12) United States Patent
Son et al.

(10) Patent No.: US 9,103,324 B2
(45) Date of Patent: Aug. 11, 2015

(54) PILLAR TYPE WIND POWER GENERATOR

(76) Inventors: Sung-Chul Son, Paju-si (KR); Ho-Yoon Son, Paju-si (KR)

( * ) Notice: Subject to any disclaimer, the term of this patent is extended or adjusted under 35 U.S.C. 154(b) by 68 days.

(21) Appl. No.: 14/131,454

(22) PCT Filed: May 17, 2012

(86) PCT No.: PCT/KR2012/003916
§ 371 (c)(1),
(2), (4) Date: Jan. 8, 2014

(87) PCT Pub. No.: WO2013/118945
PCT Pub. Date: Aug. 15, 2013

(65) Prior Publication Data
US 2014/0125065 A1 May 8, 2014

(30) Foreign Application Priority Data

Feb. 7, 2012 (KR) .......................... 20-2012-000913

(51) Int. Cl.
*F03D 3/02* (2006.01)
*F03D 3/04* (2006.01)
*F03D 9/00* (2006.01)
*F03D 11/04* (2006.01)
*F03D 1/04* (2006.01)

(52) U.S. Cl.
CPC .. *F03D 3/02* (2013.01); *F03D 1/04* (2013.01); *F03D 3/04* (2013.01); *F03D 3/0427* (2013.01); *F03D 9/002* (2013.01); *F03D 11/04* (2013.01); *F05B 2240/131* (2013.01); *Y02E 10/465* (2013.01); *Y02E 10/728* (2013.01); *Y02E 10/74* (2013.01)

(58) Field of Classification Search
CPC ............. F03D 11/04; F03D 1/04; F03D 3/04;
F03D 3/02; F03D 3/0427; F03D 9/002;
F03D 11/045; F03D 3/005; F03D 11/005;
F05B 2240/131; F05B 2240/40; F05B
2240/9111; Y02E 10/728; Y02E 10/74
See application file for complete search history.

(56) References Cited

U.S. PATENT DOCUMENTS 3,608,873 A * 9/1971 Furlong .......................... 261/30
3,936,652 A * 2/1976 Levine .............................. 290/2
4,122,675 A * 10/1978 Polyak ............................ 327/28

(Continued)

FOREIGN PATENT DOCUMENTS

KR 10-2009-0004412 1/2009
KR 10-2010-0013809 2/2010

(Continued)

*Primary Examiner* — Tulsidas C Patel
*Assistant Examiner* — Viet Nguyen
(74) *Attorney, Agent, or Firm* — Lexyoume IP Meister, PLLC (57) ABSTRACT

Disclosed is a pillar type wind power generator which has features in that the power generator is at least 20 meters high, and a plurality of wind power generation chambers are provided in a structure formed of multiple floors, and a cylindrical wind force pillar part equipped with a chimney exhaust passage at its center is provided, and a wind force inlet part communicating with an outer wall is installed in each wind power generation chamber, and a wind power generation part is provided in the wind power generation chamber so as to exhaust to the chimney exhaust passage after electric power is generated using the wind force supplied via the wind force inlet part, and a maintenance crane and a maintenance elevator are provided in the wind power generation chambers, and a guide discharge exhaust part is provided at the top of the wind force pillar part.

6 Claims, 7 Drawing Sheets

(56) References Cited

U.S. PATENT DOCUMENTS

| | | | |
|---|---|---|---|
| 4,499,034 A * | 2/1985 | McAllister, Jr. | 261/109 |
| 4,935,639 A * | 6/1990 | Yeh | 290/55 |
| 6,089,021 A * | 7/2000 | Senanayake | 60/641.12 |
| 8,134,252 B2 * | 3/2012 | Pagliasotti | 290/55 |
| 2003/0035725 A1 * | 2/2003 | Sosonkina | 416/11 |
| 2008/0093861 A1 * | 4/2008 | Friesth et al. | 290/55 |
| 2008/0279690 A1 * | 11/2008 | Rashidi | 416/176 |
| 2010/0001532 A1 * | 1/2010 | Grumazescu | 290/55 |
| 2010/0129193 A1 * | 5/2010 | Sherrer | 415/1 |
| 2011/0033288 A1 * | 2/2011 | Pezaris | 415/208.1 |
| 2011/0302879 A1 * | 12/2011 | Baker | 52/745.17 |
| 2012/0091727 A1 * | 4/2012 | Tsitron | 290/55 |
| 2012/0261926 A1 * | 10/2012 | Van Den Bulcke | 290/55 |

FOREIGN PATENT DOCUMENTS

| | | |
|---|---|---|
| KR | 10-0940193 | 2/2010 |
| WO | WO 2011029138 A1 * | 3/2011 |

* cited by examiner

PILLAR TYPE WIND POWER GENERATOR

TECHNICAL FIELD

The present invention relates to a pillar type wind power generator, and in particular to a pillar type wind power generator which makes it possible to generate all the time an electric power with the aid of a chimney effect irrespective of the direction of flowing wind in such a way that a pillar type wind power generator is at least 20 meters high, and a plurality of wind power generation chambers are provided in a structure formed of multiple floors, and a cylindrical wind force pillar part equipped with a chimney exhaust passage at its center is provided, and a wind force inlet part communicating with an outer wall is installed in each wind power generation chamber, and a wind power generation part is provided in the wind power generation chamber so as to exhaust to the chimney exhaust passage after electric power is generated using the wind force supplied via the wind force inlet part, and a maintenance crane and a maintenance elevator are provided in the wind power generation chambers, and a guide discharge exhaust part is provided at the top of the wind force pillar part.

BACKGROUND ART

Generally speaking, a wind power generator is directed to generating electric power in such a way to rotate windmill with the aid of wind.

The above mentioned wind power generator is generally installed on the ground and at the sea. Most of the wind power generators are installed at the sea because it is easy to make it larger.

As a good example of the large size wind power generator installed at the sea, 175 wind power generators are installed at the shores near Thames River of the States, the power generator being equipped with windmill blades each with a diameter of 120 meters and being 147 meters high, so 2,500 GW of electric power can be generated.

The above mentioned wind power generator is advantageous to reduce the emissions of greenhouse gases by 900 thousand tons per year.

The above mentioned wind power generators can be installed on the ground and at a higher land or at the sea. Each of the wind power generators is equipped with large size blades the diameters of each of which is above 10 to 120 meters and is constituted in a pillar type support structure. As a result of the operation of such wind power generator installed at a higher land, the area where the wind power generators are installed should have a specific condition such as a front side wind force strong enough to rotate large size blades, a high wind speed and a proper wind blow direction for the sake of the smooth rotations of the large size blades. If the wind force, the wind speed and the wind blow direction are not satisfied, an electric power generation efficiency is degraded while the blades remain stopped.

When the large size blades of the wind power generator start rotating from the stopped state, the trees and plants near the wind power generator may lose moisture due to turbulent air and ascend air current in all directions, so the trees and plants may be dried and die from quick evaporation phenomenon.

In addition, much vibrations and noises may occur in the middle of the rotations of the large size blades of the wind power generator, so the photosynthesis of the plants may be interfered and dried and may die. The water residing near the roots of the trees and plants may be dehydrated, so the soils and clay bonded by the water may be dried and loosened, owing to which the trees and plants may die. If heavy rains increasingly fall thanks to the global warming phenomenon, a great landslide may happen, so the area where the landslide happens may be devastated, causing huge damages to a lower land area. Since huge echo may occur due to the rotations of the large size blades in mountain areas, the residents living in such areas may suffer from noises. The change in wind speed may cause errors on the wind power generator installed at the sea, so managements, maintenances and repair are hard.

DISCLOSURE

Technical Problem

Accordingly, it is an object of the present invention to provide a pillar type wind power generator which was invented to overcome the problems that a conventional wind power generator has. The present invention suggests a multiple-stage electric power generation system in such a way that a wind-concentrating structure is provided, and an electric power generator with an electric power generation capacity of 0.3 MW to 0.5 MW is installed at each floor or 4 to 6 electric power generators are installed at each floor for thereby improving the problems in which electric power is generated largely depending on the flowing direction of wind.

Technical Solution

To achieve the above object, there is provided a pillar type wind power generator in which a pillar type wind power generator is at least 20 meters high, and a plurality of wind power generation chambers are provided in a structure formed of multiple floors, and a cylindrical wind force pillar part equipped with a chimney exhaust passage at its center is provided, and a wind force inlet part communicating with an outer wall is installed in each wind power generation chamber, and a wind power generation part is provided in the wind power generation chamber so as to exhaust to the chimney exhaust passage after electric power is generated using the wind force supplied via the wind force inlet part, and a maintenance crane and a maintenance elevator are provided in the wind power generation chambers, and a guide discharge exhaust part is provided at the top of the wind force pillar part.

Advantageous Effects

The present invention is directed to generating electric power using the wind which flows in the front side, lateral side and rear side directions for thereby greatly reducing air resistance which occurs due to the provision of the pillar part and the wind-based damages due to air resistance. The air inputted in the front side, lateral side and rear side directions is forced to flow via the center portion, by which the electric power efficiency can be maximized. The pillar type electric power generator of the present invention is above 20 meters high, and the wind power generation chambers are configured in a structure formed of multiple floors, and a cylindrical wind force pillar part equipped with a chimney exhaust passage at its center is provided. A wind force inlet part communicating with an outer wall is in each wind power generation chamber. A wind power generation part is provided in the wind power generation chamber for exhausting via a chimney exhaust passage with the aid of wind force supplied via the wind force inlet part after electric power is generated. An elbow tube with a certain deviation is provided to prevent collisions between the wind and the air from the wind power generation part in a chimney exhaust passage. Since the inputted strong wind and air change to a strong ascending air current while expanding and moving toward the upper side, so the wind and air inputted into the wind power generation chamber of each floor passes through the generator. Such wind and air can flow easily toward the upper side because they are weaker than the ascending air current. For this, the electric power generator installed at each floor can reliably generate electric power without any burden. A maintenance crane and a maintenance elevator are installed in the wind power generation chamber for the sake of maintenance and repair. With this, maintenance, management, repair and service can be conducted, if necessary, thus preventing potential problems and achieving economical operations.

Along with the above mentioned features, turbulent air and quick ascending air current are not formed, so nature can be kept, and the electric power generation system is environmentally friendly, and profitability can be maximized.

BEST MODE

The preferred embodiments of the present invention will be described in details.

The wind force pillar of the wind power generator according to the present invention is directed to greatly reducing air resistance, thus reducing the damages from wind while generating electric power.

The present invention is directed to providing a pillar type wind power generator which generates electric power in such a way that the wind flowing in a lateral side direction is forced to flow inside and is discharged upward via the center portions.

Figure 1:
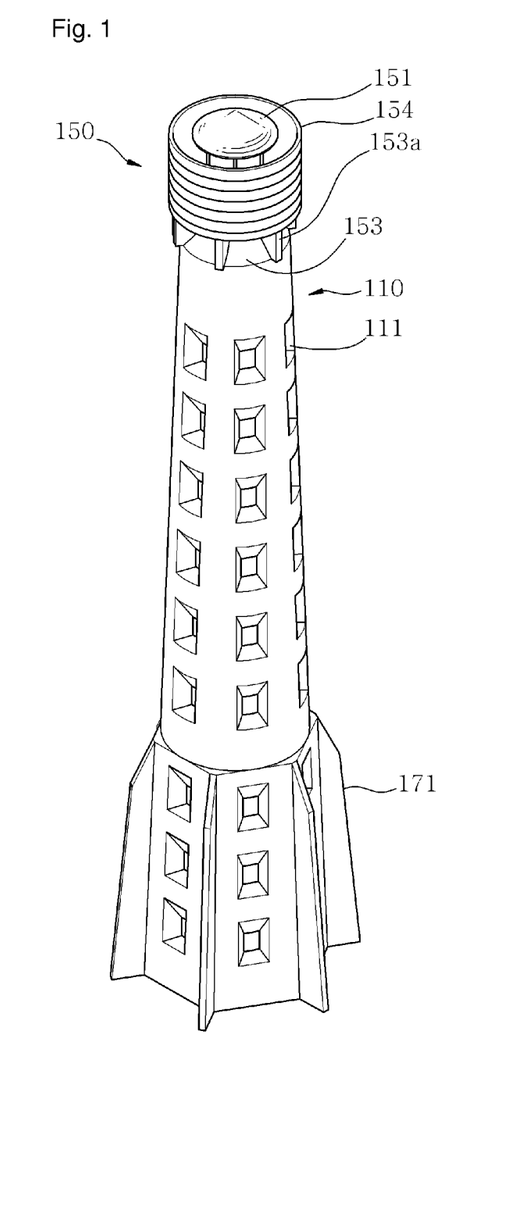
FIG. 1 is a perspective view illustrating a pillar type wind power generator according to an embodiment of the present invention.
Figure 2:
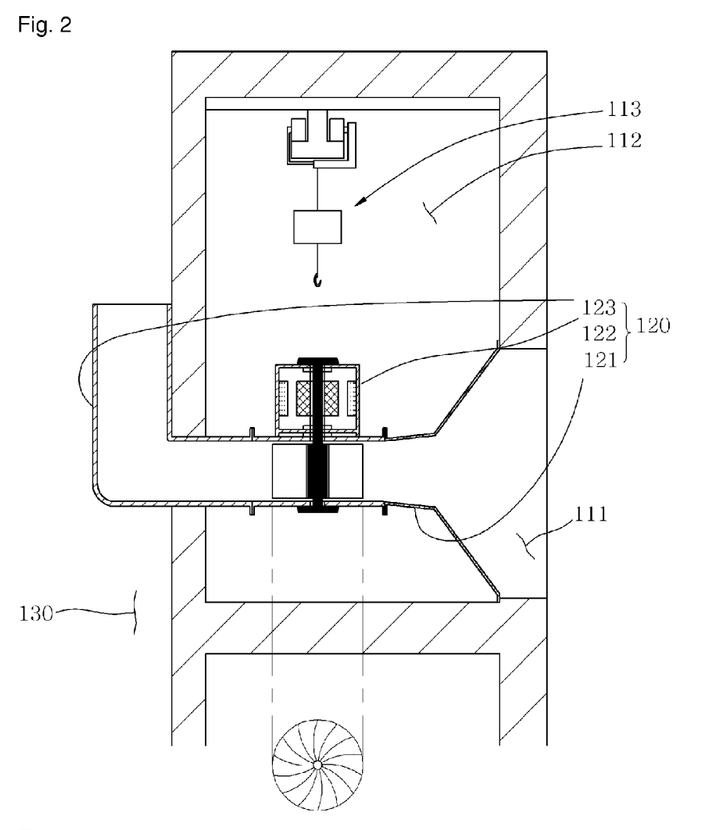
FIG. 2 is a side view illustrating a wind power generation chamber according to the present invention.
Figure 3:
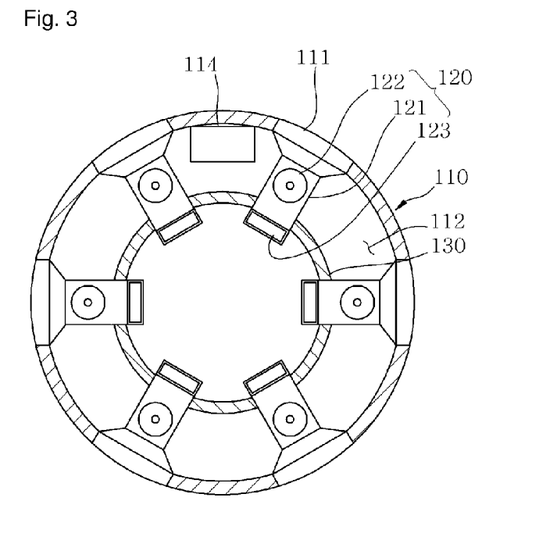
FIG. 3 is a plane view illustrating a wind power generation part according to the present invention.

As shown in FIGS. 1 to 3, the pillar type wind power generator according to the present invention has features in that the pillar type wind power generator is above 20 meters high, and the wind power generation chambers 112 are provided in a structure formed of multiple floors, and a cylindrical wind force pillar part 110 equipped with a chimney exhaust passage 130 at its center is provided, and a wind force inlet part 111 communicating with an outer wall is provided in each wind power generation chamber 112, and a wind power generation part 120 is provided in each wind power generation chamber 112 so as to exhaust via the chimney exhaust passage 130 after electric power is generated by means of a wind force inputted via the wind force inlet part 111, and a maintenance crane 113, which is movable along the donut-shaped wind power generation chambers 112 for the sake of the maintenance of the wind power generation part 120, is provided on the ceiling of the wind power generation chamber 112, and a maintenance elevator 114 connecting each floor is provided, and a guide discharge exhaust part 150 is provided at the upper side of the wind force pillar part 110, and a supplementary air inlet part 170 is provided below the wind force pillar part 110 for the sake of a smooth air circulation via the chimney exhaust passage 130.

Here, as shown in FIG. 2, the wind power generation part 120 comprises a wind power generation duct 121 which is made from an expansion and contraction tube for the sake of a smooth air input and is connected to the chimney exhaust passage 130, a wind power generator unit 122 which is installed at the center of the wind power generation duct 121, and an upper guide elbow part 123 which serves to guide in an upward direction the aid discharged to the chimney exhaust passage 130.

Figure 4:
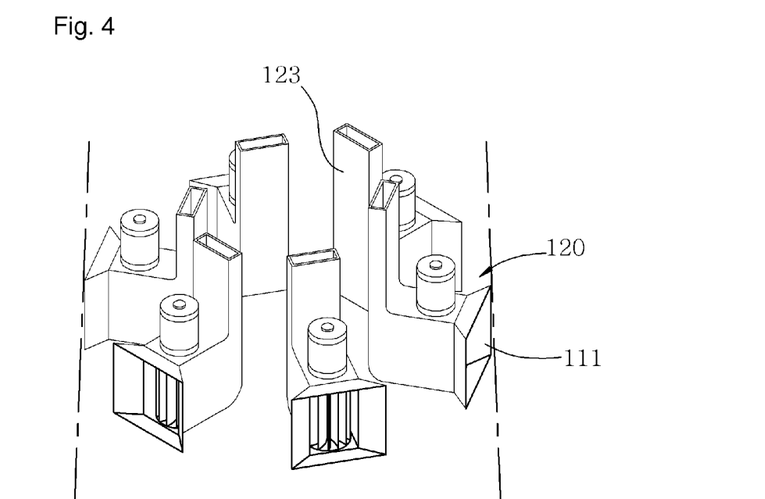
FIG. 4 is a transparent perspective view illustrating a wind power generation part according to the present invention.
Figure 5:
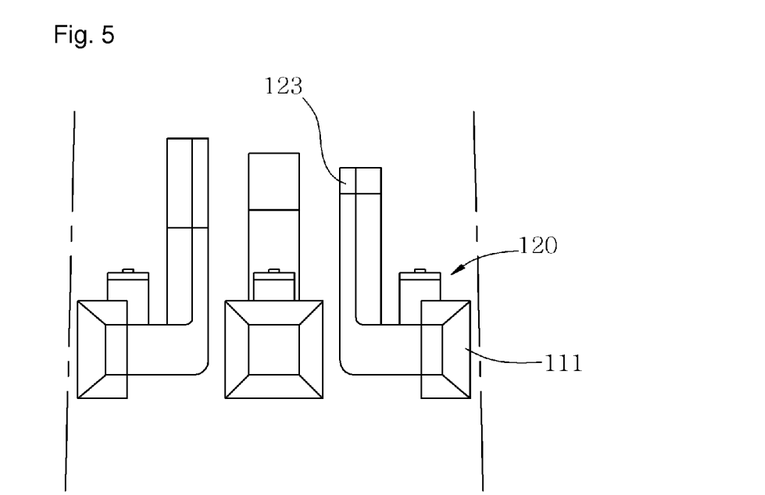
FIG. 5 is a transparent side view illustrating a wind power generation part according to the present invention.

As shown in FIGS. 4 and 5, the end portions of the discharge ports of the upper guide elbow parts 123 of the wind power generation part 120 belonging to the wind power generation chamber 112 of the same floor are formed with different heights for thereby reducing in maximum the loss in the exhaust which used to happen due to the collision of discharging air.

Figure 6:
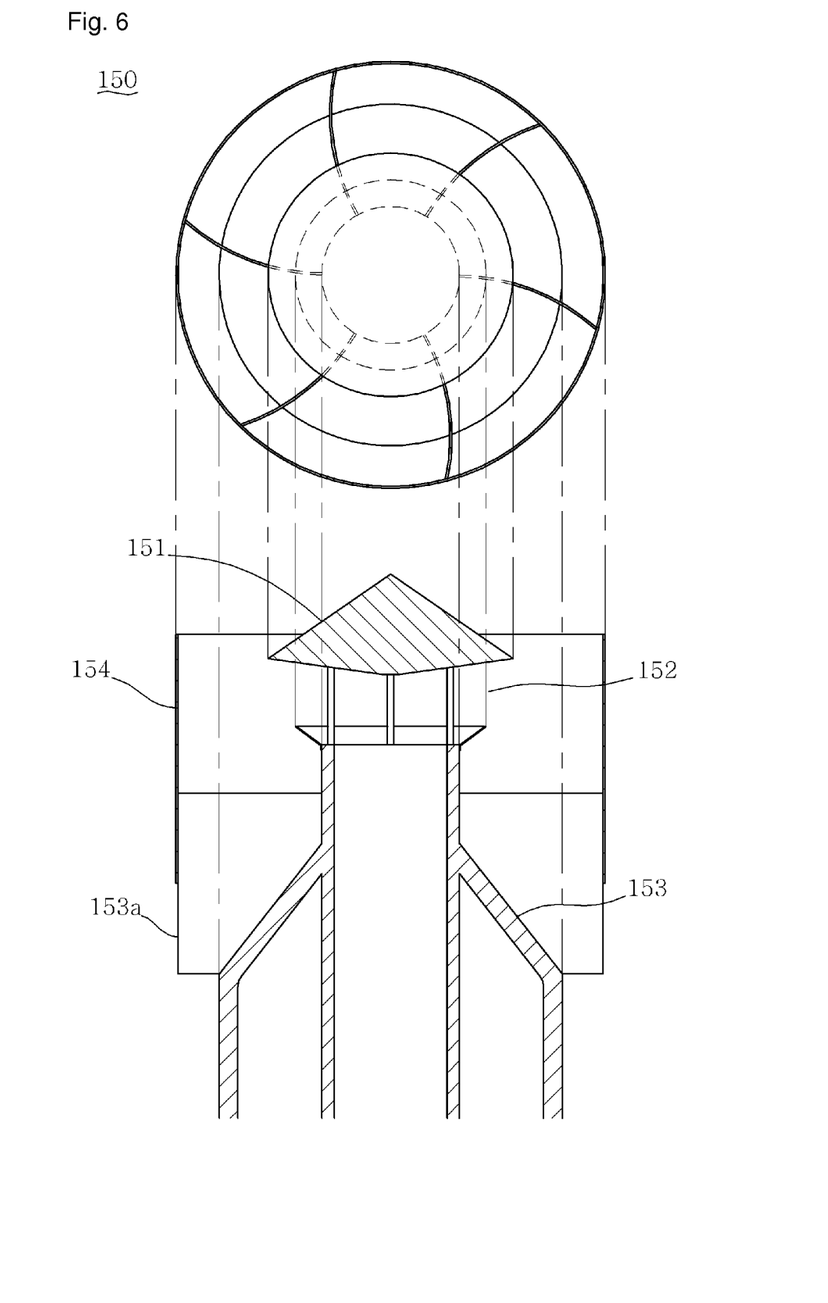
FIG. 6 is a side view illustrating a guide discharge exhaust part according to the present invention.

As shown in FIG. 6, the guide discharge exhaust part 150 comprises a conical water barrier cap 151 which serves to block rainwater from entering into the chimney exhaust passage 130, an exhaust hole 152 which is open in a lateral direction, an outer exhaust stovepipe 154 which covers the exhaust hole 152 and forms an outer stovepipe, an air guide surface 153 which serves to guide lateral wind to the wind force pillar part 110 of the lower side of the exhaust hole 152 via the outer exhaust stovepipe 154 of the upper side so as to guide the discharge of the air via the exhaust hole 152 and is inwardly slanted toward the upper side, and a circulation guide blade 153a which is provided at the air guide surface 153 for circulating the lateral wind.

The lower surface of the water barrier cap 151 is formed in a downwardly protruding conical shape which helps reduce in maximum the friction of air and enhance external discharge.

Air guide partition walls 171 are formed at regular intervals at the outer surface of the wind force pillar part 110 where the supplementary air inlet part 170 is formed, the air guide partition walls 171 being vertical enough to guide in maximum external air toward the supplementary air inlet part 170.

Figure 7:
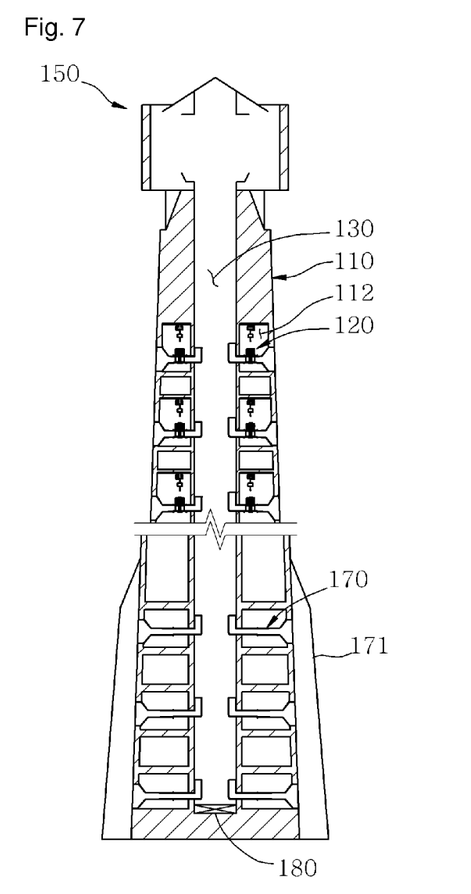
FIG. 7 is a side view illustrating the whole construction according to the present invention.

As shown in FIG. 7, in order to enhance a chimney effect with the aid of the chimney exhaust passage 130 in such a way to produce a difference in temperatures of air, a chimney effect guide heater 180 is provided below the supplementary air inlet part 170 and is driven by the electric power from the wind power generation part 120 and heats air.

Figure 8:
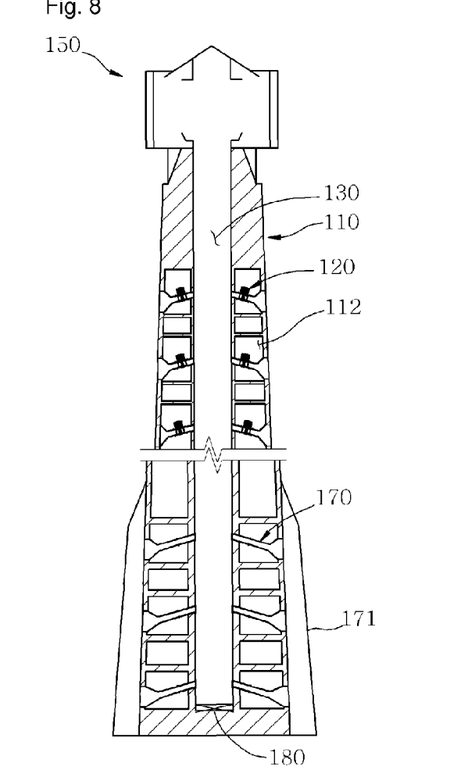
FIG. 8 is a plane view illustrating a wind power generation part according to anther embodiment of the present invention.

In addition, as shown in FIG. 8, the wind power generation duct 121 of the wind power generation part 120 may be obliquely installed in an upward direction so that the air of the ascending current generating thanks to the radiant heat of the sun can be inputted via the outer surface of the wind force pillar part 110, and the inputted air can ascend in the upward direction.

Figure 9:
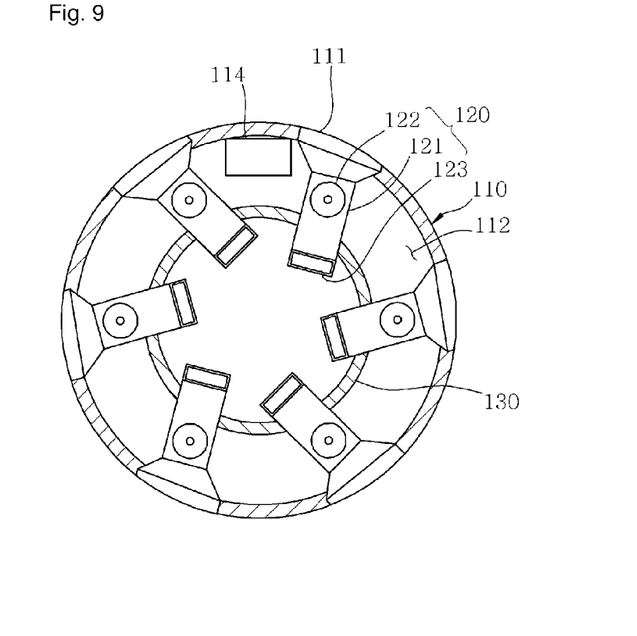
FIG. 9 is a side view illustrating a state that a wind power generation part is obliquely installed according to further another embodiment of the present invention.

As shown in FIG. 9, the wind power generation duct 121 of the wind power generation unit 120 may be installed so that ventilation can be conducted in a tangential direction with respect to the wind force pillar part 110 for the air to be spirally discharged via the chimney exhaust passage 130, which results in smooth discharge of the air.

Figure 10:
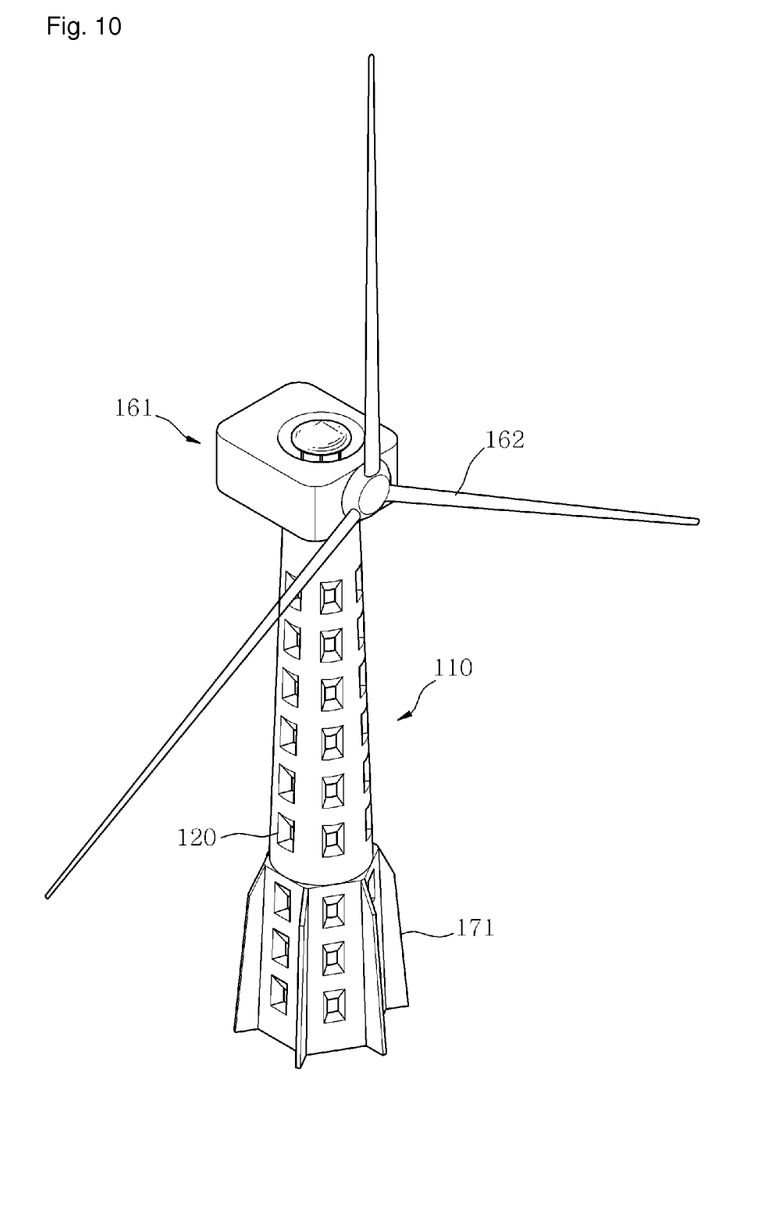
FIG. 10 is a perspective view illustrating a windmill electric power generation part according to an embodiment of the present invention.

As shown in FIG. 10, a power generation windmill 162 engaged to the windmill power generator 161 may be installed at the top of the wind force pillar part 110.

The operations of the present invention will be described.

There is provided the pillar type wind power generator of the present invention which has features in that the wind blowing in the front side, lateral side and rear side directions is guided to flow into the interior and is discharged in the upward direction via the center. The pillar type wind power generator is more than 20 meters high and has features in that the wind power generation chambers 112 are provided in a structure formed of multiple floors, and at its center is provided a wind force pillar part 110 equipped with the chimney exhaust passage 130, and a wind power inlet part 111 communicating with the outer wall is provided at each wind power generation chamber 112, and in the wind power generation chamber 112 is provided a wind power generation part 120 which serves to exhaust via the chimney exhaust passage 130 after electric power is generated by the wind force inputted via the wind force inlet part 11, and a maintenance crane 113 is provided on the ceiling of the wind power generation chamber 112 in such a way to move along the donut-shaped wind power generation chamber 112 for the sake of maintenance of the wind power generation part 120, and a maintenance elevator 114 connecting each floor is provided, and at the top of the wind force pillar part 110 is provided a guide discharge exhaust part 150, and a supplementary air inlet port 170 is provided at a lower side of the wind force pillar part 110 for smooth air circulation via the chimney exhaust passage 130. With the above mentioned elements, electric power can be generated all the time irrespective of the blowing direction of wind, in all the directions.

In addition, the air inputted via the wind force inlet parts 111 of the front side, lateral side and rear side smoothly ascends via the wind power generation part 120 provided in each wind power generation chamber 112 and via the chimney exhaust passage 130 with the aid of the differences in temperatures and atmospheres and is finally discharged to the outside, the operations of which can be obtained thanks to the input of air via the wind force inlet part 111 and the ascending current of air from the chimney exhaust passage 130, thus enhancing the efficiency of electric power generation.

In addition, when the wind force inlet part 111 is obliquely installed in the upward direction, the ascending current of air generating by the radiant heat of the sun from the outer surface of the wind force pillar part 110 ascends together into the wind force inlet part 111 and is smoothly discharged thanks to the chimney effect of the chimney exhaust passage 130.

In addition, when the wind force inlet part 111 is installed in a tangential direction with respect to the wind force pillar part 110 in a ventilation-possible way, the air inputted via the wind force inlet part 111 is spirally discharged via the chimney exhaust passage 130, so the discharge can be more smoothly performed thanks to the ascending current of air.

A guide discharge exhaust part 150 is formed at the top of the wind force pillar part 110, so the wind blowing over the top of the wind force pillar part 110 can ascend along the air guide surface 153, and the air discharging via the exhaust hole 152 can be spirally discharged via the outer exhaust stovepipe 154, thus enhancing the discharge effect of air with the aid of the discharge via the exhaust hole 153.

The exhaust guide can be doubled via the exhaust hole 152 as the air circulates by the circulation guide blade 153a of the air guide surface 153. A supplementary air inlet port 170 may be formed at the lower side of the wind force pillar part 110, by means of which the air can be supplemented from the lower side of the chimney exhaust passage 130, so the ascending circulation of the air can be more enhanced with the aid of the chimney effect, and the air input and the guide effect by means of the ascending current of air can be more enhanced at the inner side of the wind force inlet port 120.

A chimney effect guide heater 180 may be installed at the lower side of the supplementary air inlet port 170, so the air inputted via the supplementary air inlet port 170 can be heated, thus increasing in maximum the chimney effects with the difference in temperatures, and the air can be more smoothly inputted via the wind force inlet part 120, and the ascending current of air comes to flow faster via the chimney exhaust passage 130, which leads to the increased power generation.

A power generation windmill 162 engaged to the windmill power generator 161 may be provided at the top of the wind force pillar part 110, by means of which electric power can be generated by lateral wind, and electric power can be generated by the air of the upper floor, which leads to the doubled electric power generations. The present invention can be applied to the conventional windmill power generators.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A pillar type wind power generator which is able to generate electric power in such a way to receive the wind blowing in front side, lateral side and rear side directions and to discharge upward via the center, comprising:
   a plurality of wind power generation chambers provided in a structure formed of multiple floors, the pillar type wind power generator being above meters high;
   a cylindrical wind force pillar part equipped with a chimney exhaust passage at its center;
   a wind force inlet part which communicates with an outer wall and is provided in each wind power generation chamber;
   a wind power generation part which is provided in each wind power generation chamber so as to exhaust via the chimney exhaust passage after electric power is generated by means of a wind force inputted via the wind force inlet part;
   a maintenance crane, which is movable along a donut-shaped wind power generation chambers for the sake of the maintenance of the wind power generation part and which is provided on the ceiling of the wind power generation chamber;
   a maintenance elevator connecting each floor;
   a guide discharge exhaust part which is provided at the upper side of the wind force pillar part; and
   a supplementary air inlet part which is provided below the wind force pillar part for the sake of a smooth air circulation via the chimney exhaust passage
   wherein the guide discharge exhaust part comprises:
   a conical water barrier cap which serves to block rainwater from entering into the chimney exhaust passage;
   an exhaust hole which is open in a lateral direction;

an outer exhaust stovepipe which covers the exhaust hole and forms an outer stovepipe;

an air guide surface which serves to guide lateral wind to the wind force pillar part of the lower side of the exhaust hole via the outer exhaust stovepipe of the upper side so as to guide the discharge of the air via the exhaust hole and is inwardly slanted toward the upper side; and a circulation guide blade which is provided at the air guide surface for circulating the lateral wind, and the bottom of the conical water barrier cap is formed in a downwardly protruded conical shape so as to reduce in maximum the friction of air and to allow an external discharge; and air guide partition walls are vertically installed at regular intervals at the outer surface of the wind force pillar part where the supplementary air inlet part is provided, thus guiding external air toward the supplementary air inlet part.

2. The generator of claim 1, wherein the wind power generation part comprises:

a wind power generation duct which is formed of an expansion and contraction tube for the sake of smooth input of air and is connected to the chimney exhaust passage;

a wind power generator unit which is installed at a central portion of the wind power generation duct; and an upper guide elbow which allows the air discharged toward the chimney exhaust passage to flow in the upward direction, and the end portions of the discharge ports of the upper guide elbows of the wind power generation parts provided at regular intervals at the wind power generation chambers of the same floor have different heights.

3. The generator of claim 1, wherein the wind power generation duct of the wind power generation part is installed in a tangential direction with respect to the wind force pillar part in a ventilation-possible way so that the air discharged via the chimney exhaust passage is spirally discharged, by means of which the discharge of air can be smoothly performed.

4. The generator of claim 1, wherein the wind power generation duct of the wind power generation part is obliquely installed in an upward direction so that the ascending current of the air generating by means of the radiant heat of the sun can be together inputted from the outer surface of the wind force pillar part, and the input of the air is guided in the upward direction.

5. The generator of claim 1, wherein a chimney effect guide heater is provided below the supplementary air inlet part and is driven by the electric power from the wind power generation part and heats air so as to make a difference in temperatures of the air and to enhance a chimney effect with the chimney exhaust passage.

6. The generator of claim 1, wherein a power generation windmill engaged to a windmill generator is installed at the top of the wind force pillar part.

* * * * *